(12) United States Patent
Chandler

(10) Patent No.: US 9,208,214 B2
(45) Date of Patent: Dec. 8, 2015

(54) FLEXIBLE COLUMN SELECTION IN RELATIONAL DATABASES

(71) Applicant: International Business Machines Corporation, Armonk, NY (US)

(72) Inventor: Allan T. Chandler, Floreat (AU)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 13/843,220

(22) Filed: Mar. 15, 2013

(65) Prior Publication Data
US 2014/0280308 A1 Sep. 18, 2014

(51) Int. Cl.
G06F 7/00 (2006.01)
G06F 17/30 (2006.01)

(52) U.S. Cl.
CPC .................. *G06F 17/30595* (2013.01)

(58) Field of Classification Search
None
See application file for complete search history.

(56) References Cited

U.S. PATENT DOCUMENTS

| | | | | |
|---|---|---|---|---|
| 5,335,346 | A * | 8/1994 | Fabbio | 711/163 |
| 6,633,885 | B1 * | 10/2003 | Agrawal et al. | 1/1 |
| 6,658,407 | B1 * | 12/2003 | Bailey | 1/1 |
| 7,346,617 | B2 | 3/2008 | Wong | 707/694 |
| 7,461,077 | B1 * | 12/2008 | Greenwood | 1/1 |
| 7,730,067 | B2 * | 6/2010 | McCormack et al. | 707/737 |
| 8,055,669 | B1 * | 11/2011 | Singhal et al. | 707/765 |
| 8,122,048 | B2 * | 2/2012 | Dettinger et al. | 707/767 |
| 8,510,321 | B2 * | 8/2013 | Ranganathan et al. | 707/765 |
| 8,627,222 | B2 * | 1/2014 | Hartwell et al. | 715/764 |
| 9,081,830 | B1 * | 7/2015 | Stolte et al. | 1/1 |
| 2004/0153435 | A1 * | 8/2004 | Gudbjartsson et al. | 707/1 |
| 2005/0044062 | A1 * | 2/2005 | Li et al. | 707/2 |
| 2005/0154725 | A1 * | 7/2005 | Day et al. | 707/5 |
| 2006/0004686 | A1 * | 1/2006 | Molnar et al. | 707/1 |
| 2006/0117051 | A1 * | 6/2006 | Chin | 707/101 |
| 2006/0122973 | A1 * | 6/2006 | Berg et al. | 707/3 |
| 2007/0192278 | A1 * | 8/2007 | Anderson | 707/1 |
| 2007/0288526 | A1 * | 12/2007 | Mankad et al. | 707/200 |
| 2007/0288853 | A1 * | 12/2007 | Neil | 715/760 |
| 2009/0193050 | A1 * | 7/2009 | Olson | 707/102 |
| 2012/0117500 | A1 * | 5/2012 | Maim | 715/769 |

* cited by examiner

*Primary Examiner* — Hexing Liu
(74) *Attorney, Agent, or Firm* — Van Leeuwen & Van Leeuwen; Thomas E. Tyson

(57) ABSTRACT

An approach is provided to expand attributes included in an SQL expansion clause into a number of selection statements. In the approach, an expansion clause is identified in within a Structured Query Language (SQL) statement with the SQL statement identifying a relational database table. Column attributes associated with the identified relational database table are compared to attributes included in the identified expansion clause. Columns included in the relational database table are then selected based on the comparison. SQL column selection statements are then generated with each of the generated SQL column selection statements corresponding to one of the selected columns. The generated SQL column selection statements are then included in the SQL statement.

20 Claims, 8 Drawing Sheets

FLEXIBLE COLUMN SELECTION IN RELATIONAL DATABASES

TECHNICAL FIELD

The present disclosure relates to an approach that provides a flexible mechanism for selecting columns from a relational database, such as in an SQL request.

BACKGROUND OF THE INVENTION

In a typical relational database management system (DBMS), data is stored within multiple databases, with each database containing one or more tables and each table containing one or more columns. Data for each of these columns are added to individual rows so that the layout of a table is essentially a grid formation with horizontal rows and vertical columns. A row holds information on one of the entities stored in the table and the columns contain attributes of that entity. By way of example, an organization may have an employee table with columns representing employee serial number, name, work location, phone number, home contact details, salary and so forth. Each row in that table would hold information for a single employee. One of the primary use cases for databases is the selection of data from the database for eventual consumption by end users or programs. In relational databases, this is typically handled by a potentially complex command called SELECT. This is one of the commands made available in the standard Structured Query Language (SQL). The SELECT statement allows the extraction of data with many clauses dictating characteristics such as which data is extracted from each row (which columns), how the rows are filtered (which rows), how rows may be aggregated (such as rolling up employees from a single region into a single row to give the total or average salary for the region), how the rows are ordered (such as by employee serial number or last name), as well as many other options, including complex options that join different tables together to get useful information. In traditional database implementations, it is the first option, the selection of what columns to extract, which is the most limiting.

In the SQL standard, and in the vast majority of DBMS products that implement SQL, there are essentially two choices when selecting columns. First, selecting all the columns with SELECT *, or second, selecting specific, known-in-advance columns, such as SELECT employee_id, UPPER (employee_name), employee_address. The use of the SELECT * is often frowned upon since it may involve retrieving data from the database that is not actually needed. In addition, SELECT * has the limitation that the user cannot perform transformation functions on the column data (such as UPPER( ) to return uppercase values for one of the columns). To select less than the full set of columns, or to use transformation functions, the user is faced with using the second form that specifies each of the columns being retrieved. A primary challenge with using the second form is that it often requires rather large select statements since the user needs to specify every column that is being requested, as well as specifying each and every function performed on those columns. This can lead to complex, ungainly SELECT statements which are time consuming and difficult to construct.

SUMMARY

An approach is provided to expand attributes included in an SQL expansion clause into a number of selection statements. In the approach, an expansion clause is identified in within a Structured Query Language (SQL) statement with the SQL statement identifying a relational database table. Column attributes associated with the identified relational database table are compared to attributes included in the identified expansion clause. Columns included in the relational database table are then selected based on the comparison. SQL column selection statements are then generated with each of the generated SQL column selection statements corresponding to one of the selected columns. The generated SQL column selection statements are then included in the SQL statement.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
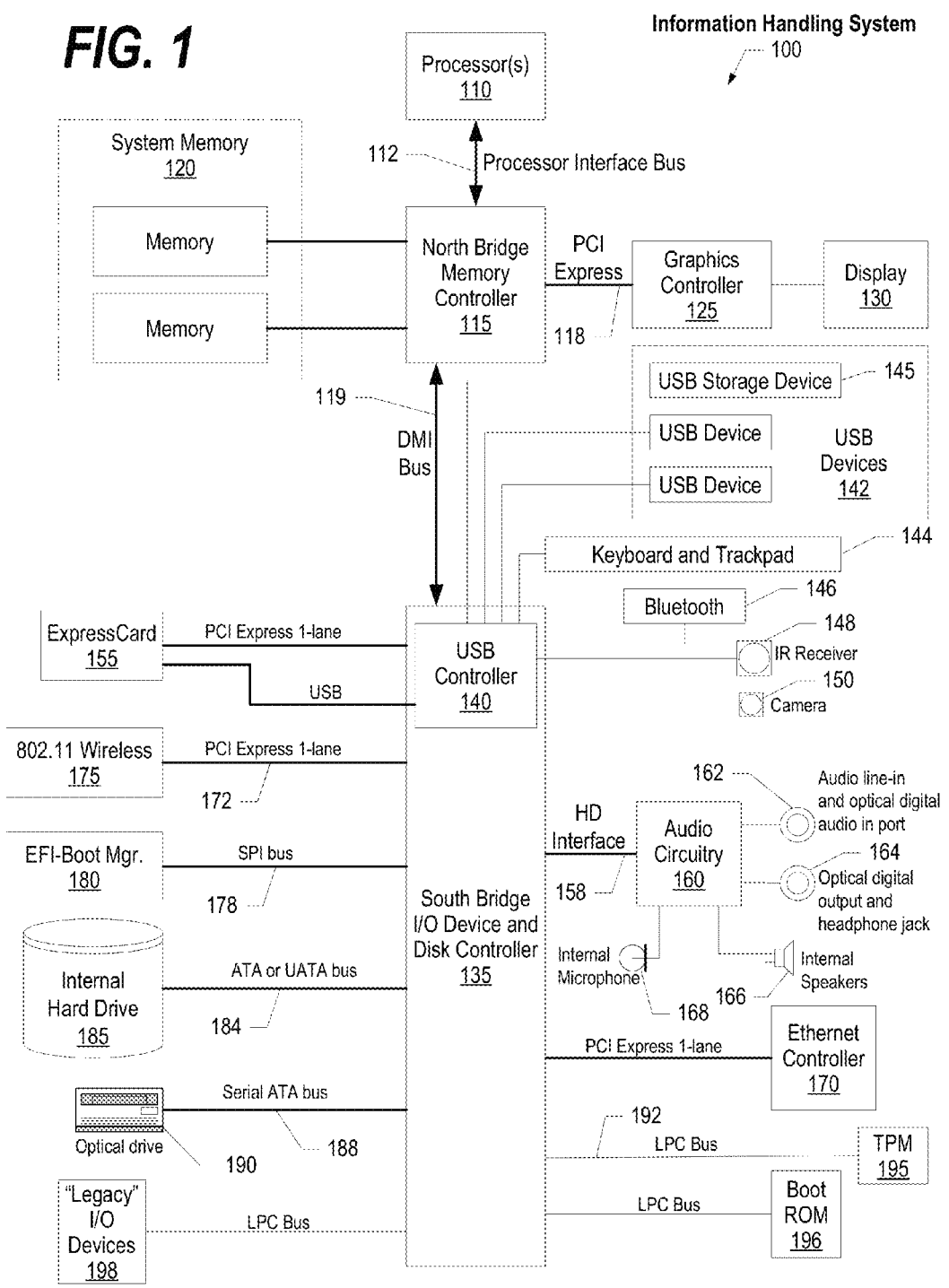
FIG. 1 is a block diagram of a data processing system in which the methods described herein can be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus 192. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. EFI (Extensible Firmware Interface) boot manager 180 connects to Southbridge 135 using Serial Peripheral Interface (SPI) Bus 178. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
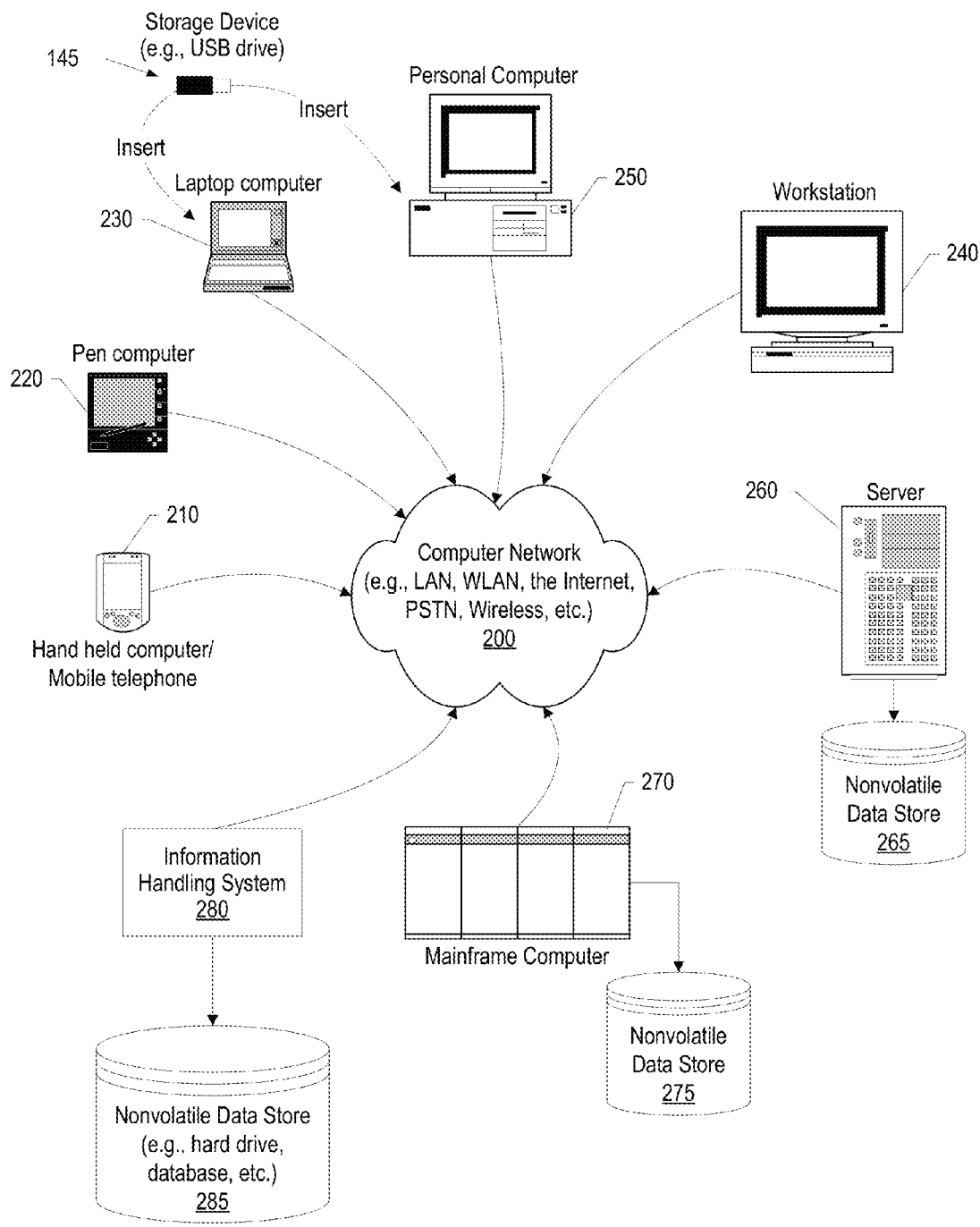
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8 depict an approach that can be executed on an information handling system, such as a mobile device, and computer network as shown in FIGS. 1-2. The approach disclosed herein is directed to flexible column selection in relational databases. The approach includes three elements which, on their own or in conjunction with each other, provide a simpler but more expressive and succinct way of selecting columns from a database. These elements include (1) column selection based on more than requesting every column in the table or having to individually specified each column being requested with optional transformations; (2) column transformations that can apply to multiple columns rather than individually specified columns; and (3) column renaming on multiple columns, again not required to be performed on individually specified columns. In one embodiment, the approach provides changes to the DBMS, the SQL language and the SQL analysis/execution code to translate the language changes into a more normal form. The approach provides an expressive way to use the database, creation of smaller yet more powerful SQL statements that are easier to maintain, no added objects (such as views) needed in the database, the ability to use the approach in an ad-hoc manner (unlike views), and he ability to adapt to table changes automatically, given are consistent naming standards.

In order to minimize the changes to the DBMS, in one embodiment, the approach is structured as a layer that translates the new SQL language syntax into regular syntax. This could easily be implemented initially as a pre-processor for SQL statements outside the DBMS itself.

A process is executed early in the SQL analysis/execution engine which expands the new syntax to the current (traditional) SQL form. The syntax itself can simply be a pseudo-function such as MORPH( ) or EXPAND( ) which will be provided with flexible column selection, column transformation, and column naming as previously discussed. In the descriptions and examples shown in FIGS. 3-8, the pseudo-function is referred to as the EXPAND( ) function, however those skilled in the art will appreciate that any available function name could be used in place of the term EXPAND.

An example would be:

EXPAND (<<Column selection>>, <<Column transformation>>, <<Column naming>>)

with the second and third parts of the pseudo-function being optional if, for example, no transformations were needed on the selected columns.

Although the following text is not meant to limit the implementation in any way, it provides examples of the sort of features this approach makes possible. First, regarding column selection, databases already store meta-information about tables and the columns within the tables. The metadata allows the SELECT and other commands to work and to allow administration of the DBMS. This metadata provides additional column information (names, types and sizes, among other things) that can be used in selecting columns. In one embodiment, the column selection clause of the EXPAND( ) clause is a flexible mini-language that allows a multitude of columns to be selected using a single clause. Examples include:

"[unselected]"—all columns not yet selected.
"[type=integer]"—all columns defined as type integer.
"[name=(SYS|TOT)_.*_PCT]"—all columns which match the regular expression "(SYS|TOT)_.*_PCT", those that start with either "SYS_" or "TOT_" and end with "_PCT".
"[list=COL1,COL2,COL3]"—specific columns to allow full control not necessarily available from regular expressions.
"[name=.* PCT] and [type=float]"—all float type columns with the name ending in "_PCT".
"([type=char] or [type=varchar]) and [size>4]"—all char and varchar types with a size greater than 4.
"not [name=.*_PCT]"—all columns that do not end with "_PCT".

The final three example shows how filters could be combined to allow all or either condition to select a column, and to allow negative conditions—these utilize standard logical operators found in most programming languages. In one embodiment, the form for this "mini-language" is a declarative one where the user simply states the conditions that have to be satisfied to include a given column.

Second, regarding column transformations, the approach again utilizes a mini-language specifying the transformations to be applied to each of the columns selected. The column selection phase, discussed above, weeds out any undesired columns the user can control which columns have transformations applied. For example, the column transformation "coalesce ($, 0)" will, when applied to a column called POSSIBLY_NULL_INTEGER, result in the text coalesce (POSSIBLY_NULL_INTEGER, 0), which is a way of enforcing NULL values to be treated as zero. A large number of similar columns (either by name, type or other factors) can have a single transformation applied to all of them with a single transformation clause.

Third, and finally, regarding column naming, allows flexibility in the naming of columns. Naming with the as clause, such as in "select hour(event_time) as event_hour", allows a column to be given a specific name in the returned data set, giving users and programs control over column names used or shown in the resulting data set. Similar to the column selection and transformation clauses, in one embodiment the column is implemented as a mini-language that applies a series of transformations on the name of the column to produce the new name. By way of example, using commands similar to a commonly used text editor, the expression "s/^/APPL_/; s/_CPU_/_/g" is enough to prefix the name with the text "APPL_" and replace all occurrences of the text "_CPU_" with a single "_". Any number of naming transformations on the original column name could be effected this way simply by stringing the transformations together.

The following example shows a possible usage of the EXPAND( ) function. In one embodiment, the EXPAND( ) function utilizes three sets of parameters—the column selection parameter, the column transformation parameter, and the column naming parameter. Syntax of the EXPAND( ) function may therefore be described as "EXPAND (<column selections>, <column transformations>, <column naming>)". Using this syntax, an example of a SELECT statement that utilizes the EXPAND( ) pseudo-function is as follows:

```
SELECT
    DATE,
    SYSTEM_ID,
    HOUR(TIME) AS HOUR,
    EXPAND ("[name=.*_PCT]", "AVG($)", "s/^CPU_//;
    s/_USE_PCT$/_PCT/; s/_ON_CPU_/_/g; s/^/APPL_/"),
    EXPAND ("[name=.*_LIMIT]", "MAX($)", "s/^/APPL_/"),
FROM hourly_stats,
WHERE DATE > '2013-01-01';
```

Might be expanded to a traditional SQL SELECT statement such as:

```
SELECT
    DATE,
    SYSTEM_ID,
    HOUR(TIME) AS HOUR,
    AVG(CPU_PCT) AS APPL_PCT,
    AVG(USE_ON_CPU_PCT) AS APPL_USE_PCT,
    AVG(TOT_USE_PCT) AS APPL_TOT_PCT,
    AVG(TOT_USE_ON_CPU_PCT) AS APPL_TOT_USE_PCT,
    AVG(SYS_USE_PCT) AS APPL_SYS_PCT,
    AVG(SYS_USE_ON_CPU_PCT) AS APPL_SYS_USE_PCT,
    AVG(USR_USE_PCT) AS APPL_USR_PCT,
    AVG(USR_USE_ON_CPU_PCT) AS APPL_USR_USE_PCT,
    AVG(INT_USE_PCT) AS APPL_INT_PCT,
    AVG(INT_USE_ON_CPU_PCT) AS APPL_INT_USE_PCT,
    AVG(SLP_USE_PCT) AS APPL_SLP_PCT,
    AVG(SLP_USE_ON_CPU_PCT) AS APPL_SLP_USE_PCT,
    MAX(CPU_LIMIT) AS APPL_CPU_LIMIT,
    MAX(MEM_LIMIT) AS APPL_MEM_LIMIT
FROM hourly_stats,
WHERE DATE > '2013-01-01';
```

The SELECT statement with the EXPAND( ) pseudo-functions is more compact, easier to write and maintain, and more expressive than the traditional SQL SELECT form. Further examples and descriptions are found in FIGS. 3-8, which are described below.

Figure 3:
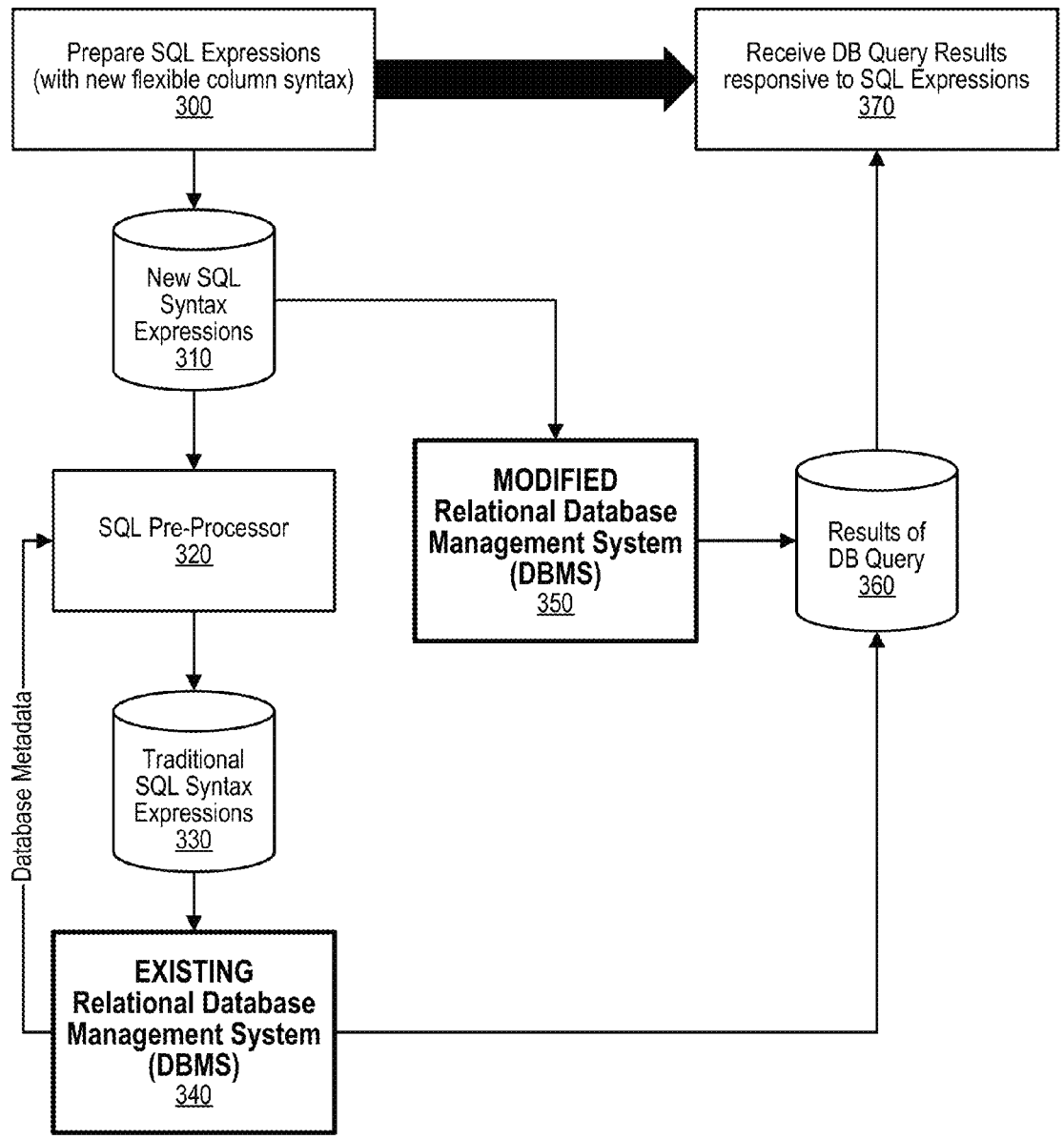
FIG. 3 is a high level diagram showing the overall processing of Structured Query Language (SQL) expressions with flexible column syntax.

FIG. 3 is a high level diagram showing the overall processing of Structured Query Language (SQL) expressions with flexible column syntax. At step 300, SQL expressions are prepared that include the flexible column syntax within one or more expansion clauses, such as the EXPAND( ) clause used in the example from the previous section. The SQL statements that include expansion clauses are stored in data store 310, such as a stored routine, ad-hoc query, or the like.

In one embodiment, the SQL statements are processed by SQL pre-processor 320 which is a process that reads the SQL statements from data store 310 and also retrieves database metadata from an existing (e.g., traditional, etc.) database management system (DBMS), such as DBMS 340. The database metadata includes attributes pertaining to database tables managed by the DBMS. These attributes include items such as column names, column data types, and a column data size pertaining to the various tables. In the embodiment that utilizes SQL pre-processor 320, the SQL pre-processor generates SQL statements from the SQL statements read from data store 310 with the generated SQL statements including SQL column selection statements that were derived from the expansion clauses by the SQL pre-processor. The generated SQL statements are "traditional" SQL statements that can be processed by an existing relational DBMS. The generated SQL statements are stored in data store 330 which is used as an input to DBMS 340. The result of processing the generated SQL statements by DBMS 340 is a set of database results which are stored in data store 360.

In a second embodiment, the SQL statements are processed by modified relational DBMS 350 which has been modified to process the expansion clauses included in the SQL statements without use of an SQL pre-processor. In this embodiment, the modified relational DBMS reads the SQL statements that include expansion clauses from data store 310, compares column attributes associated with database tables managed by DBMS 350 to attributes included in the expansion clauses, internally generates the SQL column selection statements and processes the SQL statement with the SQL column selection statements resulting in a set of database results 360.

From the user's perspective, after preparing the SQL expressions that include expansion clauses in step 300, the same set of results (360) are received at step 370 responsive to the user's SQL expressions. Utilizing an SQL pre-processor, such as in the first embodiment, may take additional time in comparison with utilizing modified DBMS 350, however the underlying database query performed using the generated SQL column selection statements is the same in either embodiment.

Figure 4:
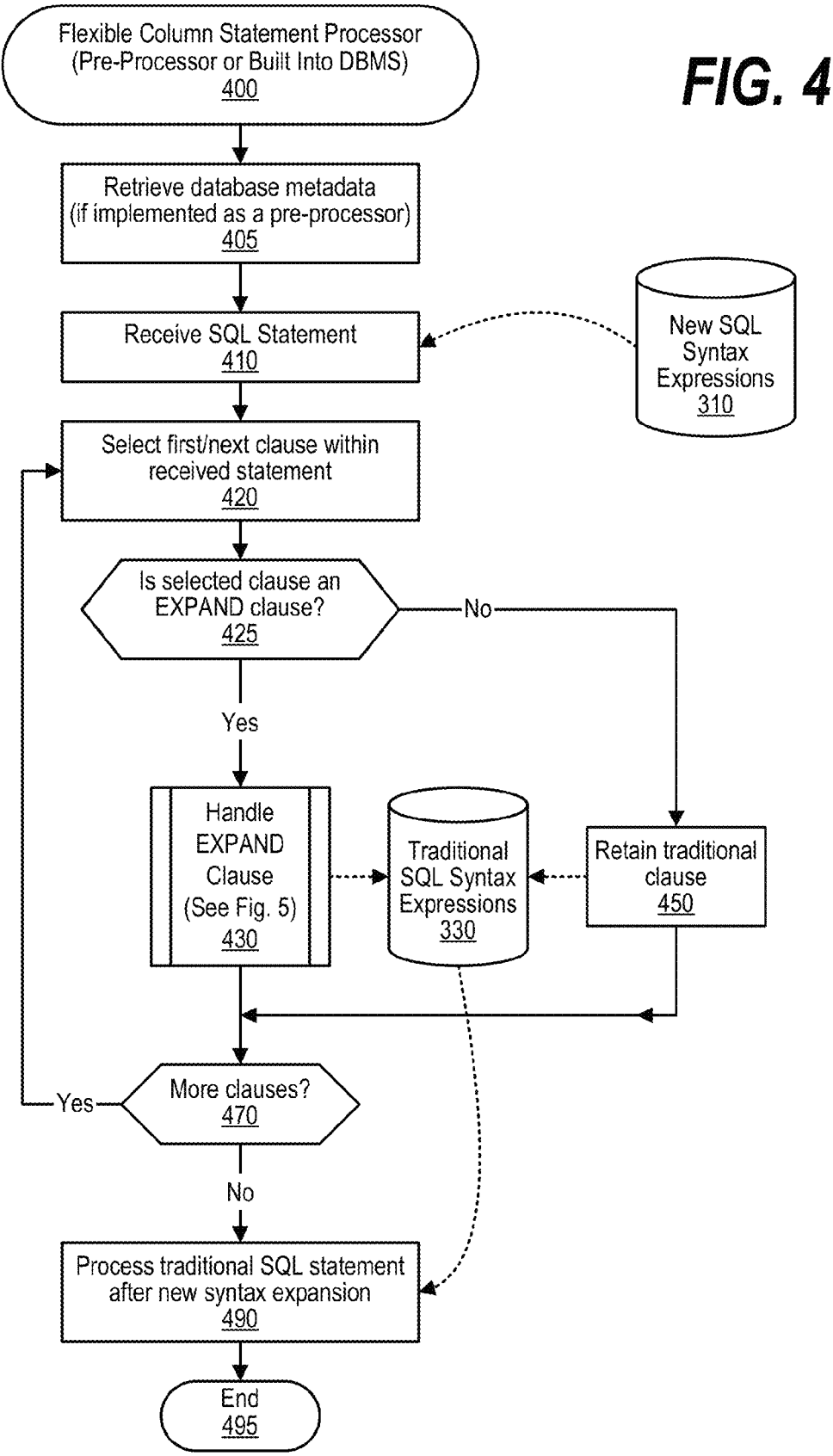
FIG. 4 is a depiction of a flowchart showing the logic used in a flexible column statement processor.

FIG. 4 is a depiction of a flowchart showing the logic used in a flexible column statement processor. Flexible column statement processing, either performed in an SQL statement pre-processor, such as by process 320 in FIG. 3, or in a modified database management system (DBMS), such as by modified DBMS 350 in FIG. 3, commences at 400 in FIG. 4. At step 405, database metadata pertaining to the database table that is the subject of the SQL statement is retrieved. At step 410, the process receives an SQL statement from data store 310 with the SQL statement possibly including one or more expansion clauses.

At step 420, the first clause within the received SQL statement is selected. A decision is made as to whether the selected clause is an expansion clause (decision 425). In the example shown, the expansion clause is shown as a clause named EXPAND( ) with various parameters as input to the EXPAND( ) clause to provide column selection arguments, transformation arguments, and column naming arguments. Those skilled in the art will appreciate that the expansion clause could be given a different name with the name EXPAND only being an example of one possible name.

A decision is made as to whether the clause selected at step 420 is an expansion clause (decision 425). If the selected clause is an expansion clause, then decision 425 branches to the "yes" branch whereupon, at predefined process 430, the expansion clause is processed (see FIG. 5 and corresponding text for processing details). The statements resulting from processing the expansion clause are stored in data store 330. On the other hand, if the selected clause is not an expansion clause, then decision 425 branches to the "no" branch whereupon, at step 450, the SQL clause (non-expansion clause) is retained in data store 330 without modification by predefined process 430. After the selected clause has been processed by either predefined process 430 or by step 450, a decision is made as to whether there are more clauses in the SQL statement to process (decision 470). If there are more clauses to process, then decision 470 branches to the "yes" branch which loops back to select and process the next clause in the SQL statement as described above. This looping continues until all of the clauses in the SQL statement have been processed, at which point decision 470 branches to the "no" branch whereupon the generated SQL statement stored in data store 330 is processed by a relational database management system (DBMS) at step 490. Processing thereafter ends at 495.

Figure 5:
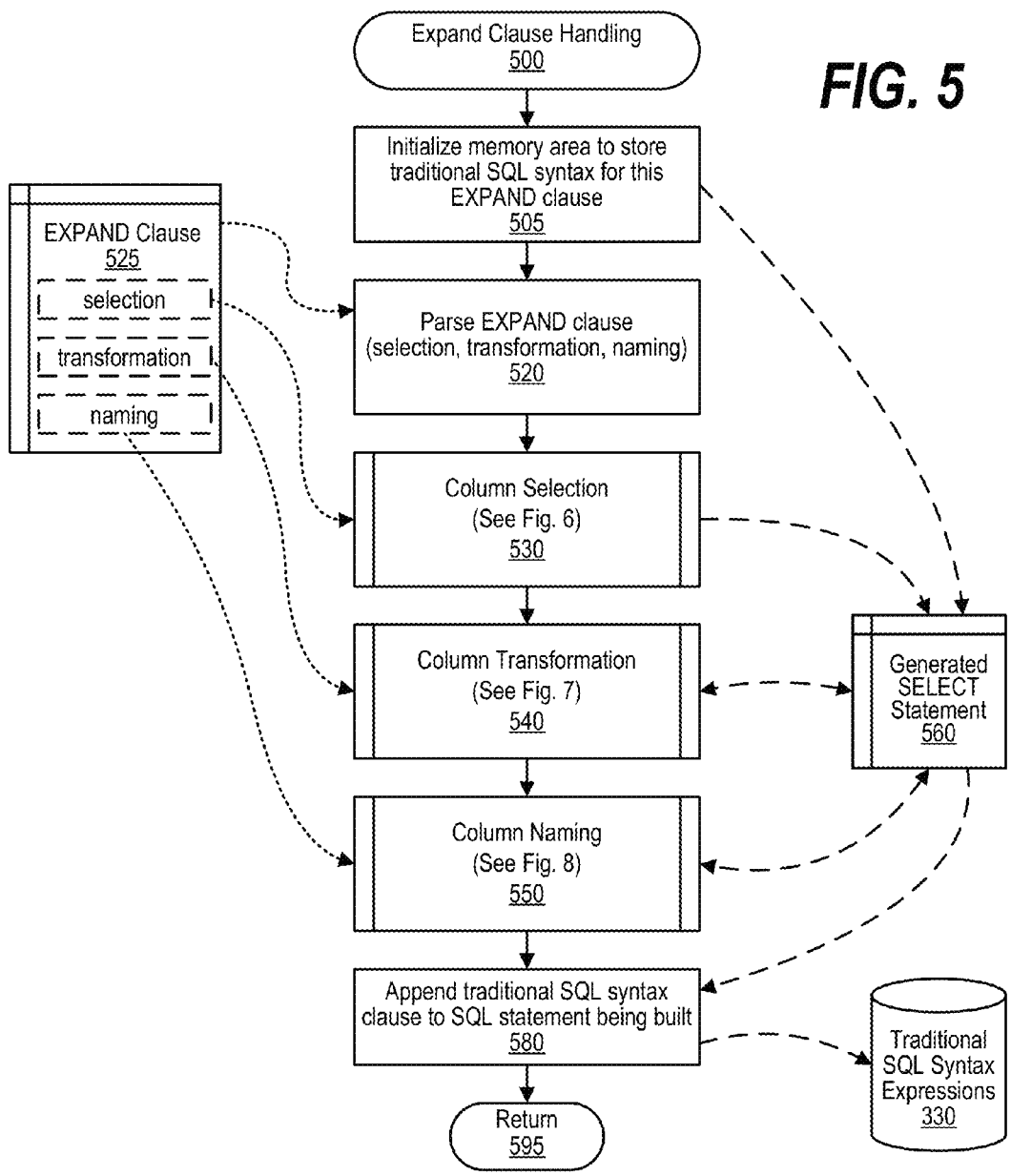
FIG. 5 is a depiction of a flowchart showing the logic used in handling an SQL EXPAND clause that use flexible column syntax.

FIG. 5 is a depiction of a flowchart showing the logic used in handling an SQL EXPAND clause that use flexible column syntax. The processing shown in FIG. 5 is called by FIG. 4 (see predefined process 430) whenever an expansion clause is identified in an SQL statement. The processing shown in FIG. 5 operates to generate various column selection statements, transformation attributes, and naming attributes. Processing commences at 500 whereupon, at step 505, the process initializes a memory area (memory area 560) that will be used to store the traditional SQL syntax resulting from the processing of the expansion clause. At step 520, the expansion clause received from the calling routine (525) is parsed into various parameters. In one embodiment, these parameters include a column selection parameter, a transformation parameter, and a column naming parameter separated by delimiters (e.g., commas (,), etc.). In the embodiment shown, a column parameter is required and identifies columns that are selected from the database table with the other parameters being optional and operating against the identified columns.

Figure 6:
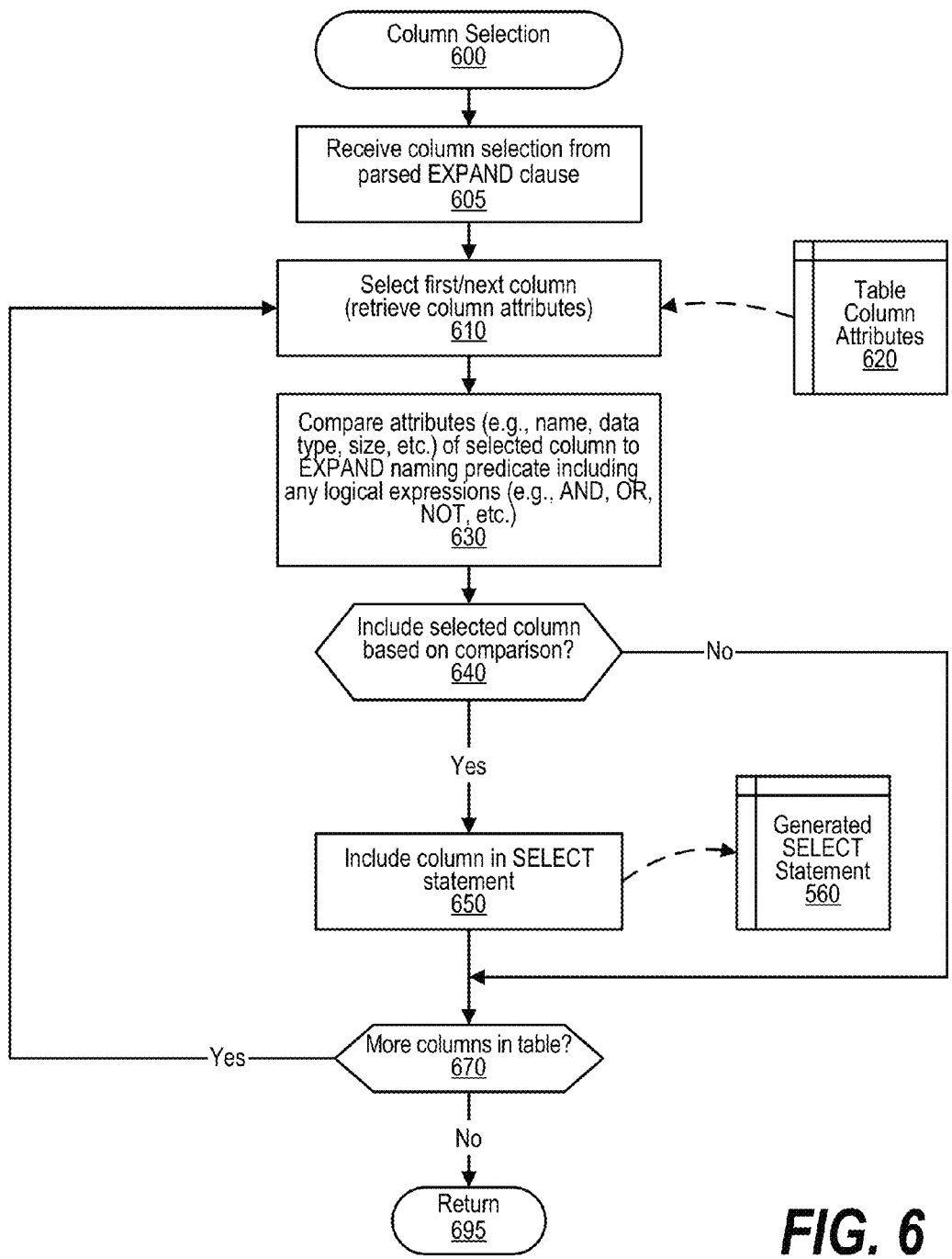
FIG. 6 is a depiction of a flowchart showing the logic used in flexibly selecting columns based on attributes found in the EXPAND clause.

At predefined process 530, the column selection parameter is processed to select columns that are being selected from the table (see FIG. 6 and corresponding text for processing details). The results of predefined process 530 are a set of column names that are being selected from the table with these column names being stored in memory area 560. Note that while the column names are included in memory area 560, the column selection parameter may use different attributes to identify the columns. For example, if all columns with a data type of "DATE" are being selected from an employee table with the employee table including both an employee BIRTH_DATE and an employee HIRE_DATE, then both BIRTH_DATE and HIRE_DATE would be selected from the table and stored in memory area 560.

Figure 7:
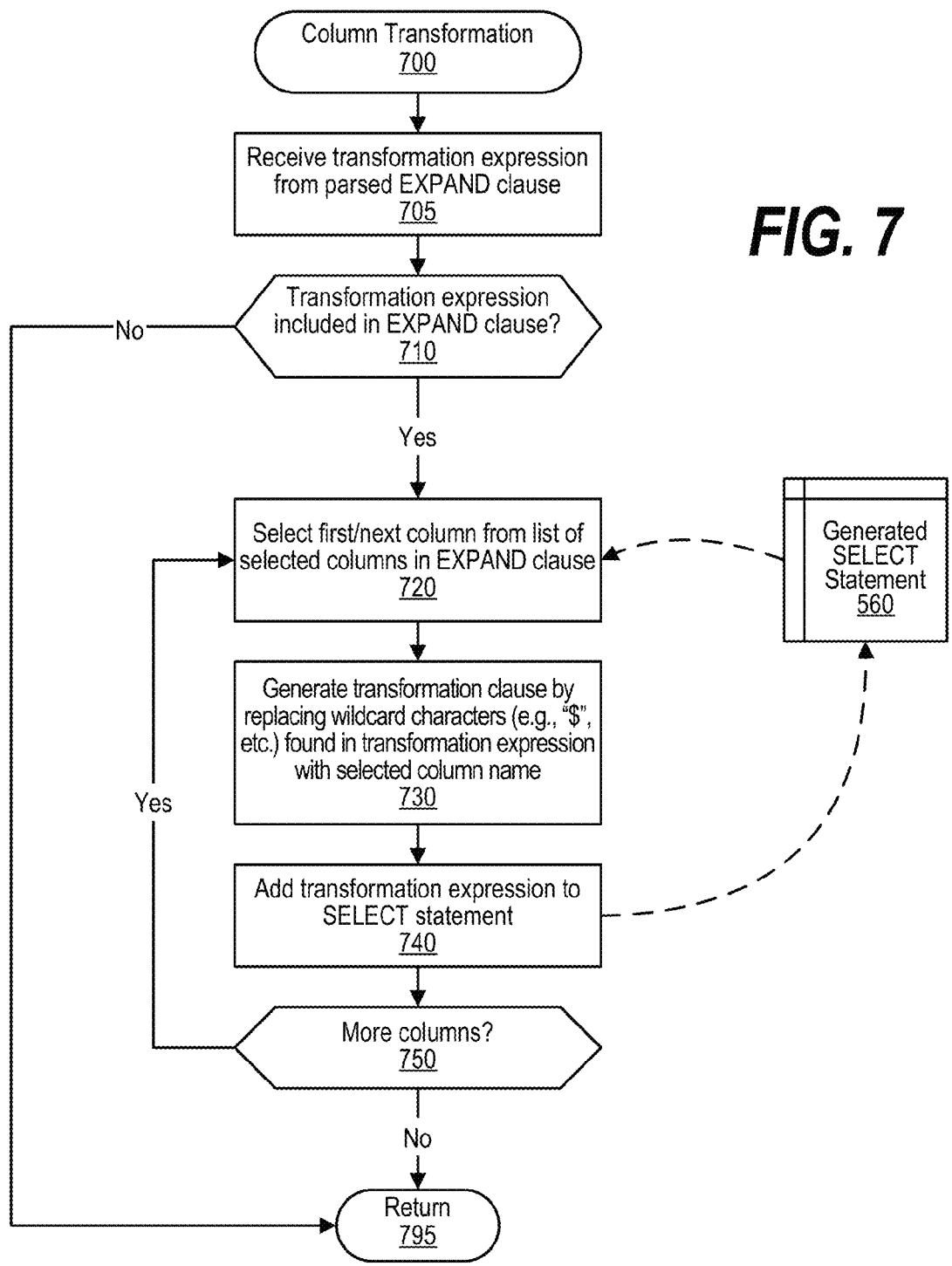
FIG. 7 is a depiction of a flowchart showing the logic used in handling column transformations on selected columns based on attributes found in the EXPAND clause.

At step 540, the column transformation parameter is processed against those columns that were selected by predefined process 530 (see FIG. 7 and corresponding text for processing details). Using the example from the previous paragraph, the transformation parameter would be processed against the columns BIRTH_DATE and HIRE_DATE.

Figure 8:
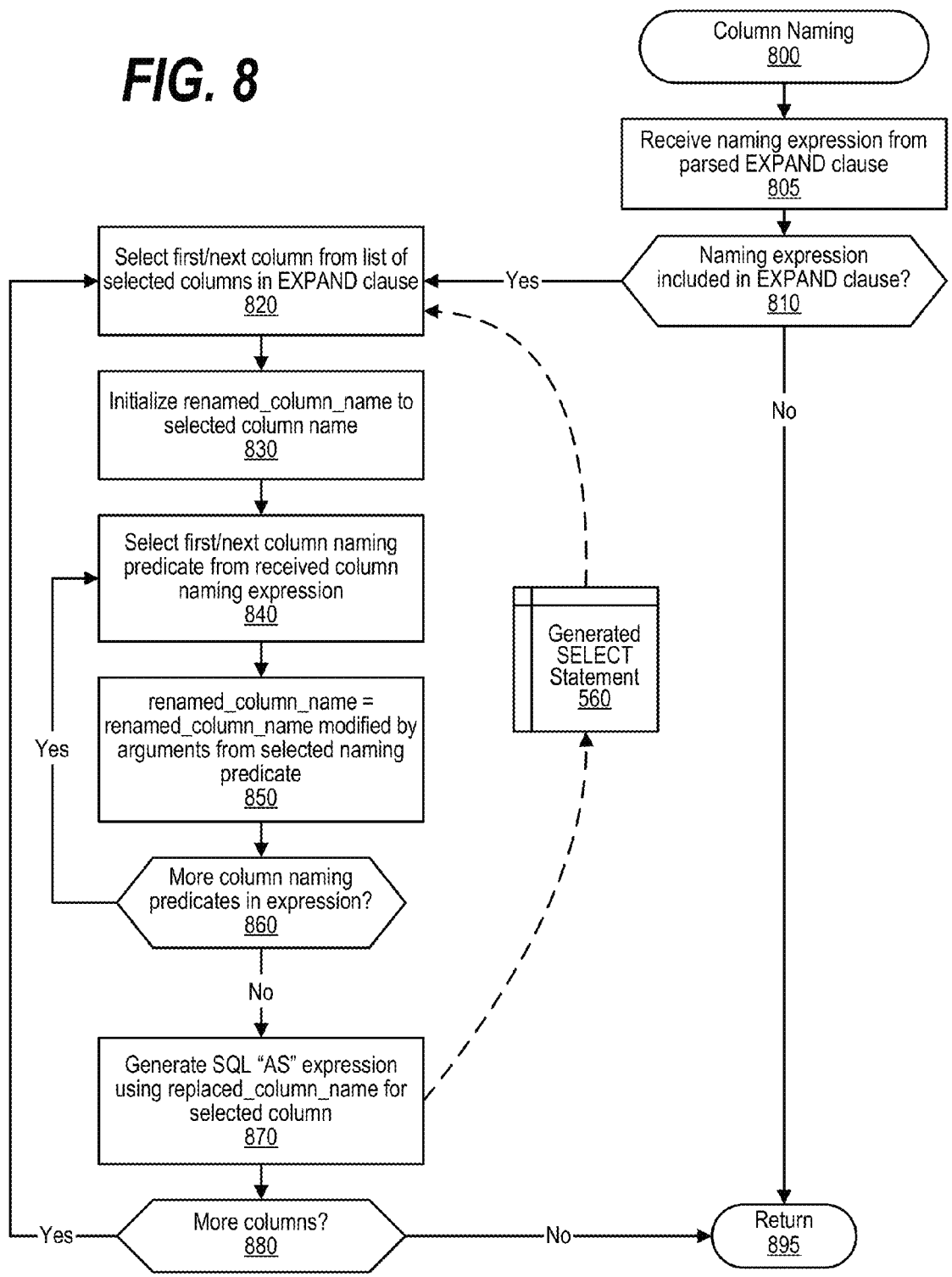
FIG. 8 is a depiction of a flowchart showing the logic used in handling column naming requests on selected columns based on attributes found in the EXPAND clause.

At step 550, the column naming parameter is also processed against those columns that were selected by predefined process 530 (see FIG. 8 and corresponding text for processing details). Again, using the example from the previous two paragraphs, the naming parameter would be processed against the columns BIRTH_DATE and HIRE_DATE.

At step 580, after the column selection, column transformation, and column naming parameters have been processed, then the SELECT statement generated and stored in memory area 560 is appended to the SQL statement that is being generated and stored in data store 330. Processing then returns to the calling routine (see FIG. 4) at 595.

FIG. 6 is a depiction of a flowchart showing the logic used in flexibly selecting columns based on attributes found in the EXPAND clause. This routine is called by FIG. 5 (see predefined process 530) to handle the column selection parameter identified in an expansion clause. Processing commences at 600 whereupon, at step 605, the column selection parameter is received from the parsed expansion clause. At step 610, the first column is selected from database column attributes (metadata) from the table column attributes which are stored in memory area 620. At step 630, the selected column attributes (e.g., name, data type, size, etc.) are compared against the column attributes found in the column selection parameter. In addition, in one embodiment, multiple comparisons can be made with the comparisons joined by logical operators (e.g., AND, OR, NOT, etc.). For example, the column attributes parameter may specify columns with a data type of DATE "OR" columns with a column name beginning with EMPLOYEE ("EMPLOYEE"). This would result in the selection of BIRTH_DATE and HIRE_DATE as well as the selection of columns with names beginning with the name "EMPLOYEE", such as columns named EMPLOYEE_NAME, EMPLOYEE_SALARY, and EMPLOYEE_LEVEL.

A decision is made as to whether to include the selected column based on the comparison (decision 640). Using the example from above, if the column being processed is named EMPLOYEE_SALARY then the column would be included based on the comparison, while if the column is DEPARTMENT_NAME then the column would not be included based on the comparison. If the selected column should be included based on the comparison, then decision 640 branches to the "yes" branch whereupon, at step 650, the selected column name is included in the SELECT statement that is being generated (with the generated SELECT statement being stored in memory area 560). On the other hand, if the selected column should not be included based on the comparison, then decision 640 branches to the "no" branch bypassing step 650.

A decision is made as to whether there are more columns in the table to process and compare to the column selection parameter (decision 670). If there are additional columns to process, then decision 670 branches to the "yes" branch which loops back to select and process the next column as described above. This looping continues until all of the columns in the table have been processed, at which point decision 670 branches to the "no" branch and processing returns to the calling routine (see FIG. 5) at 695.

FIG. 7 is a depiction of a flowchart showing the logic used in handling column transformations on selected columns based on attributes found in the EXPAND clause. This routine is called by FIG. 5 (see predefined process 540) to handle the column transformation parameter identified in an expansion clause. Processing commences at 700 whereupon, at step 705, the column transformation parameter is received from the parsed expansion clause. A decision is made as to whether the expansion clause includes a column transformation parameter (decision 710). If the expansion clause does not include a column transformation parameter, then decision 710 branches to the "no" branch skipping the remainder of the column transformation steps whereupon processing returns to the calling routine (see FIG. 5) at 795. On the other hand, if the expansion clause includes a column transformation parameter, then decision 710 branches to the "yes" branch in order to process the column transformation parameter.

At step 720, the process selects the first column selected by the column selection routine based on the column selection parameter included in this expansion clause. At step 730, the process generates a transformation clause by replacing wildcard characters (e.g., "$", etc.) found in the transformation parameter with the selected column name. At step 740, the generated transformation expression is added to the SELECT statement pertaining to the selected column. A decision is made as to whether there are additional columns that resulted from the processing of the column selection parameter of this expansion clause (decision 750). If there are additional columns that resulted from the processing of the column selection parameter of this expansion clause, then decision 750 branches to the "yes" branch which loops back to select the next column and generate the transformation clause as described above. This looping continues until there are no more columns that resulted from the processing of the column selection parameter of this expansion clause, at which point decision 750 branches to the "no" branch and processing returns to the calling routine (see FIG. 5) at 795.

FIG. 8 is a depiction of a flowchart showing the logic used in handling column naming requests on selected columns based on attributes found in the EXPAND clause. This routine is called by FIG. 5 (see predefined process 550) to handle the column naming parameter identified in an expansion clause. Processing commences at 800 whereupon, at step 805, the column naming parameter is received from the parsed expansion clause. A decision is made as to whether the expansion clause includes a column naming parameter (decision 810). If the expansion clause does not include a column naming parameter, then decision 810 branches to the "no" branch skipping the remainder of the column naming steps whereupon processing returns to the calling routine (see FIG. 5) at 895. On the other hand, if the expansion clause includes a column naming parameter, then decision 810 branches to the "yes" branch in order to process the column naming parameter.

At step 820, the process selects the first column selected by the column selection routine based on the column selection parameter included in this expansion clause. At step 830, the process initializes a variable to store the renamed column name with the initialized value being the selected column name. At step 840, the first column naming predicate is selected from the column naming parameter. At step 850, the renamed column name variable is modified based on the arguments included in the selected column naming predicate.

As multiple naming predicates can be defined, a decision is made as to whether there are more column naming predicates in the column naming parameter (decision 860). If there are more column naming predicates to process, then decision 860 branches to the "yes" branch which loops back to select and process the next naming predicate which results in a further modified column name. This looping continues until all of the column naming predicates have been processed, at which point decision 860 branches to the "no" branch whereupon, at step 870, an SQL "AS" expression is generated using the renamed column name variable for selected column.

A decision is made as to whether there are additional columns that resulted from the processing of the column selection parameter of this expansion clause (decision 880). If there are additional columns that resulted from the processing of the column selection parameter of this expansion clause, then decision 880 branches to the "yes" branch which loops back to select the next column and process the naming parameter for the selected column as described above. This looping continues until there are no more columns that resulted from the processing of the column selection parameter of this expansion clause, at which point decision 880 branches to the "no" branch and processing returns to the calling routine (see FIG. 5) at 895.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system, comprising:
   identifying an expansion clause within a Structured Query Language (SQL) statement, wherein the SQL statement identifies a relational database table;
   comparing one or more column attributes associated with the identified relational database table to one or more attributes included in the identified expansion clause;
   selecting one or more columns included in the relational database table based on the comparison;
   generating a plurality of SQL column selection statements, with each of the generated SQL column selection statements corresponding to a different one of the selected one or more columns; and
   including the generated SQL column selection statements in the SQL statement.

2. The method of claim 1 wherein the column attributes are selected from the group consisting of a column name, a column data type, and a column data size, and wherein the comparing further comprises:
   identifying a column attribute type, a wildcard character and a search string in one of the attributes included in the identified expression clause; and
   comparing the search string to a portion of the identified column attribute type based on a position of the wildcard character in relation to the search string.

3. The method of claim 2 wherein the column attributes include a plurality of column attributes related with one or more logical operators, wherein the logical operators are selected from the group consisting of AND, OR, and NOT.

4. The method of claim 1 further comprising:
   identifying one or more transformation attributes included in the identified expansion clause;
   applying the identified transformation attributes to at least one of the selected one or more columns; and
   modifying one or more of the generated plurality of SQL column selection statements by adding the identified transformation attributes.

5. The method of claim 1 further comprising:
   identifying one or more naming attributes included in the identified expansion clause;
   comparing the identified naming attributes to one or more column names corresponding to the selected columns, the comparing resulting in one or more renamed columns;
   generating an SQL AS clause corresponding to each of the renamed columns wherein each of the SQL AS clauses includes a new name derived from one of the identified naming attributes; and
   modifying each of the generated plurality of SQL column selection statements corresponding to each of the renamed columns by adding the respective SQL AS clause.

6. The method of claim 1 wherein the identifying, comparing, selecting, generating, and including are performed by an expansion clause processor that is built into a relational database management system (DBMS), and wherein the method further comprises:
   executing the generated SQL column selection statements included in the SQL statement by the DBMS, wherein the executing results in a set of database results.

7. The method of claim 1 wherein the identifying, comparing, selecting, generating, and including are performed by an SQL pre-processor process, and wherein the method further comprises:
   processing the SQL statement by the SQL pre-processor, the processing resulting in the generated SQL column selection statements being included in the SQL statement; and
   executing the SQL statement that includes the generated SQL column selection statements using a relational database management system (DBMS) wherein the executing results in a set of database results.

8. An information handling system comprising:
   a plurality of processors;
   a memory coupled to at least one of the processors;
   a set of instructions stored in the memory and executed by at least one of the processors, wherein the set of instructions perform actions of:
   identifying an expansion clause within a Structured Query Language (SQL) statement, wherein the SQL statement identifies a relational database table;
   comparing one or more column attributes associated with the identified relational database table to one or more attributes included in the identified expansion clause;
   selecting one or more columns included in the relational database table based on the comparison;
   generating a plurality of SQL column selection statements, with each of the generated SQL column selection statements corresponding to a different one of the selected one or more columns; and
   including the generated SQL column selection statements in the SQL statement.

9. The information handling system of claim 8 wherein the column attributes are selected from the group consisting of a column name, a column data type, and a column data size, and wherein the comparing further actions comprising:
   identifying a column attribute type, a wildcard character and a search string in one of the attributes included in the identified expression clause; and
   comparing the search string to a portion of the identified column attribute type based on a position of the wildcard character in relation to the search string.

10. The information handling system of claim 9 wherein the column attributes include a plurality of column attributes related with one or more logical operators, wherein the logical operators are selected from the group consisting of AND, OR, and NOT.

11. The information handling system of claim 8 wherein the actions further comprise:
   identifying one or more transformation attributes included in the identified expansion clause;
   applying the identified transformation attributes to at least one of the selected one or more columns; and
   modifying one or more of the generated plurality of SQL column selection statements by adding the identified transformation attributes.

12. The information handling system of claim 8 wherein the actions further comprise:
   identifying one or more naming attributes included in the identified expansion clause;
   comparing the identified naming attributes to one or more column names corresponding to the selected columns, the comparing resulting in one or more renamed columns;
   generating an SQL AS clause corresponding to each of the renamed columns wherein each of the SQL AS clauses includes a new name derived from one of the identified naming attributes; and
   modifying each of the generated plurality of SQL column selection statements corresponding to each of the renamed columns by adding the respective SQL AS clause.

13. The information handling system of claim 8 wherein the identifying, comparing, selecting, generating, and including are performed by an expansion clause processor that is built into a relational database management system (DBMS), and wherein the actions further comprise:
   executing the generated SQL column selection statements included in the SQL statement by the DBMS, wherein the executing results in a set of database results.

14. The information handling system of claim 8 wherein the identifying, comparing, selecting, generating, and including are performed by an SQL pre-processor process, and wherein the actions further comprise:
   processing the SQL statement by the SQL pre-processor, the processing resulting in the generated SQL column selection statements being included in the SQL statement; and
   executing the SQL statement that includes the generated SQL column selection statements using a relational database management system (DBMS) wherein the executing results in a set of database results.

15. A computer program product stored in a non-transitory computer readable medium, comprising computer instructions that, when executed by an information handling system, causes the information handling system to perform actions comprising:
   identifying an expansion clause within a Structured Query Language (SQL) statement, wherein the SQL statement identifies a relational database table;
   comparing one or more column attributes associated with the identified relational database table to one or more attributes included in the identified expansion clause;
   selecting one or more columns included in the relational database table based on the comparison;
   generating a plurality of SQL column selection statements, with each of the generated SQL column selection statements corresponding to a different one of the selected one or more columns; and
   including the generated SQL column selection statements in the SQL statement.

16. The computer program product of claim 15 wherein the column attributes are selected from the group consisting of a column name, a column data type, and a column data size, and wherein the comparing further comprises actions of:
   identifying a column attribute type, a wildcard character and a search string in one of the attributes included in the identified expression clause; and
   comparing the search string to a portion of the identified column attribute type based on a position of the wildcard character in relation to the search string.

17. The computer program product of claim 16 wherein the column attributes include a plurality of column attributes related with one or more logical operators, wherein the logical operators are selected from the group consisting of AND, OR, and NOT.

18. The computer program product of claim 15 wherein the actions further comprise:
   identifying one or more transformation attributes included in the identified expansion clause;
   applying the identified transformation attributes to at least one of the selected one or more columns; and
   modifying one or more of the generated plurality of SQL column selection statements by adding the identified transformation attributes.

19. The computer program product of claim 15 wherein the actions further comprise:
   identifying one or more naming attributes included in the identified expansion clause;
   comparing the identified naming attributes to one or more column names corresponding to the selected columns, the comparing resulting in one or more renamed columns;
   generating an SQL AS clause corresponding to each of the renamed columns wherein each of the SQL AS clauses includes a new name derived from one of the identified naming attributes; and
   modifying each of the generated plurality of SQL column selection statements corresponding to each of the renamed columns by adding the respective SQL AS clause.

20. The computer program product of claim 15 wherein the identifying, comparing, selecting, generating, and including are performed by an SQL pre-processor process, and wherein the actions further comprise:
   processing the SQL statement by the SQL pre-processor, the processing resulting in the generated SQL column selection statements being included in the SQL statement.

* * * * *